US011379725B2

United States Patent
Baughman et al.

(10) Patent No.: US 11,379,725 B2
(45) Date of Patent: Jul. 5, 2022

(54) PROJECTILE EXTRAPOLATION AND SEQUENCE SYNTHESIS FROM VIDEO USING CONVOLUTION

(71) Applicant: International Business Machines Corporation, Armonk, NY (US)

(72) Inventors: Aaron K. Baughman, Silver Spring, MD (US); Stephen C. Hammer, Marietta, GA (US); Micah Forster, Austin, TX (US); John C. Newell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1042 days.

(21) Appl. No.: 16/023,823

(22) Filed: Jun. 29, 2018

(65) Prior Publication Data
US 2020/0005150 A1 Jan. 2, 2020

(51) Int. Cl.
| | | |
|---|---|---|
| *G06T 7/20* | (2017.01) | |
| *G06V 40/20* | (2022.01) | |
| *G06N 3/08* | (2006.01) | |
| *G06K 9/62* | (2022.01) | |
| *A63B 71/06* | (2006.01) | |
| *G06V 20/40* | (2022.01) | |

(52) U.S. Cl.
CPC ......... *G06N 3/084* (2013.01); *A63B 71/0622* (2013.01); *G06K 9/6256* (2013.01); *G06T 7/20* (2013.01); *G06V 20/42* (2022.01); *G06V 40/23* (2022.01)

(58) Field of Classification Search
None
See application file for complete search history.

(56) References Cited

U.S. PATENT DOCUMENTS

| | | | |
|---|---|---|---|
| 7,860,344 B1 | 12/2010 | Fitzpatrick et al. | |
| 9,265,991 B2 | 2/2016 | Hohteri | |
| 10,173,100 B2 * | 1/2019 | Sinha | ................ H04N 21/2743 |

(Continued)

FOREIGN PATENT DOCUMENTS

| | | |
|---|---|---|
| JP | 2004532391 A | 10/2004 |
| WO | 2003007240 A1 | 1/2003 |

OTHER PUBLICATIONS

J. Li, Q. Tian, G. Zhang, Fangyuan Zheng, Ch. Lv, J. Wang, "Research on hybrid information recognition algorithm and quality of golf swing," Computers & Electrical Engineering, vol. 69, 2018, pp. 907-919, ISSN 0045 7906, https://doi.org/10.1016/j.compeleceng.2018.02.013 (Year: 2018).*

(Continued)

*Primary Examiner* — Bernard Krasnic
(74) *Attorney, Agent, or Firm* — Yee & Associates, P.C.

(57) ABSTRACT

Using a simple cue to reduce a number of sequential frames included in a video that needs to be analyzed by an artificial neural network to predict information corresponding to a projectile depicted within the video is provided. A timing of the simple cue associated with the video is detected. The number of sequential frames within the video is reduced down to only those frames that are within a specified range of the simple cue. The artificial neural network is used to analyze the reduced number of sequential frames. The information corresponding to the projectile is predicted based on analyzing the reduced number of sequential frames using the artificial neural network.

18 Claims, 15 Drawing Sheets

(56) References Cited

U.S. PATENT DOCUMENTS

| | | | |
|---|---|---|---|
| 2005/0261073 A1 | 11/2005 | Farrington, Jr. et al. | |
| 2008/0200287 A1 | 8/2008 | Marty et al. | |
| 2011/0183787 A1 | 7/2011 | Schwenger et al. | |
| 2014/0180451 A1* | 6/2014 | Marty | A63B 15/00 700/91 |
| 2019/0366153 A1* | 12/2019 | Zhang | A63B 24/0062 |

OTHER PUBLICATIONS

Anonymous, "Convolutional neural network," Wikimedia Foundation, Inc., Wikipedia, last edited on Mar. 7, 2018, accessed Mar. 11, 2018, 20 pages. https://en.wikipedia.org/wiki/Convolutional_neural_network.

Miyamoto et al., "A tennis serve and upswing learning robot based on bi-directional theory," Neural Networks 11, copyright Elsevier Science Ltd, 1998, pp. 1331-1344.

Wolpert et al., "Computational principles of movement neuroscience," Nature Neuroscience, vol. 3, Nov. 2000, pp. 1212-1217.

Zhang et al., "An Adaptive Trajectory Prediction Method for Ping-Pong Robots," International Conference on Intelligent Robotics and Applications, Part III, Springer, Berlin, Heidelberg, 2012, pp. 448-459.

Xie et al., "Synthesizing Dynamic Patterns by Spatial-Temporal Generative ConvNet," 2017 IEEE Conference on Computer Vision and Pattern Recognition (CVPR), Honolulu, Hawaii, Jul. 2017, 9 pages.

Farin et al., "Floor-Plan Reconstruction from Panoramic Images," Proceedings of the 15th ACM International Conference on Multimedia, Augsburg, Germany, Sep. 2007, 4 pages.

Shrestha et al., "Automatic Mashup Generation from Multiple-camera Concert Recordings," Proceedings of the 18th ACM International Conference on Multimedia, Firenze, Italy, Oct. 2010, 11 pages.

Han et al., "A Real-Time Augmented-Reality System for Sports Broadcast Video Enhancement," Proceedings of the 15th ACM international conference on Multimedia, Augsburg, Germany, Sep. 2007, 4 pages.

Niklaus et al., "Video Frame Interpolation via Adaptive Convolution," 2017 IEEE Conference on Computer Vision and Pattern Recognition (CVPR), Honolulu, Hawaii, Jul. 2017, 10 pages. http://ieeexplore.ieee.org/document/8099727/.

Liu et al., "Video Frame Synthesis Using Deep Voxel Flow," 2017 IEEE International Conference on Computer Vision (ICCV), Venice, Italy, Oct. 2017, 9 pages. http://ieeexplore.ieee.org/document/8237740/.

* cited by examiner

PROJECTILE EXTRAPOLATION AND SEQUENCE SYNTHESIS FROM VIDEO USING CONVOLUTION

BACKGROUND

1. Field

The disclosure relates generally to deep learning and more specifically to projectile extrapolation and alternative image sequence synthesis from video using an artificial neural network.

2. Description of the Related Art

Deep learning is a branch of machine learning based on a set of algorithms that attempts to model high-level abstractions in data by using artificial neural network architectures composed of multiple non-linear transformations. Artificial neural networks may include, for example, convolutional neural networks, residual neural networks, recurrent neural networks, stochastic neural networks, and the like. Learning can be supervised or unsupervised. Deep learning architectures have been applied to fields, such as, for example, computer vision, speech recognition, and natural language processing, where these architectures have produced results comparable to and in some cases superior to human experts.

Deep learning uses a cascade of multiple layers of processing nodes for feature extraction and transformation. Each successive layer of nodes uses the output from the previous layer of nodes as input. The deep architecture is organized as a graph. The nodes in the graph are connected by links to propagate activation, calculated at the origin, to the destination nodes. Each link has a weight that determines the relative strength and sign of the connection and each node applies an activation function to all of the weighted sum of incoming activations. The activation function is given as a hard threshold, a sigmoid function, or a hyperbolic tangent, for example.

Such deep architectures learn progressively and improve performance on tasks by considering examples, generally without task-specific programming. For example, in image recognition, these deep architectures might learn to identify images that contain tennis players by analyzing example images that have been manually labeled as "tennis player" or "no tennis player" and using the results to identify tennis players in other images. As another example, in audio recognition, these deep architectures might learn to identify sounds that indicate emotion, such as frustration, in a person by analyzing sound samples that have been manually labeled as "frustration" or "no frustration" and using the results to identify a frustrated person in other sound inputs. These deep architectures are able to do this without any prior knowledge about tennis players or emotional sounds made by a tennis player during play. Instead, these deep architectures evolve their own sets of relevant characteristics from the training data that they process.

SUMMARY

According to one illustrative embodiment, a computer-implemented method for using a simple cue to reduce a number of sequential frames included in a video that needs to be analyzed by an artificial neural network to predict information corresponding to a projectile depicted within the video is provided. A timing of the simple cue associated with the video is detected. The number of sequential frames within the video is reduced down to only those frames that are within a specified range of the simple cue. The artificial neural network is used to analyze the reduced number of sequential frames. The information corresponding to the projectile is predicted based on analyzing the reduced number of sequential frames using the artificial neural network. According to other illustrative embodiments, a computer system and computer program product for using a simple cue to reduce a number of sequential frames included in a video that needs to be analyzed by an artificial neural network to predict information corresponding to a projectile depicted within the video are provided.

DETAILED DESCRIPTION

Figure 1:
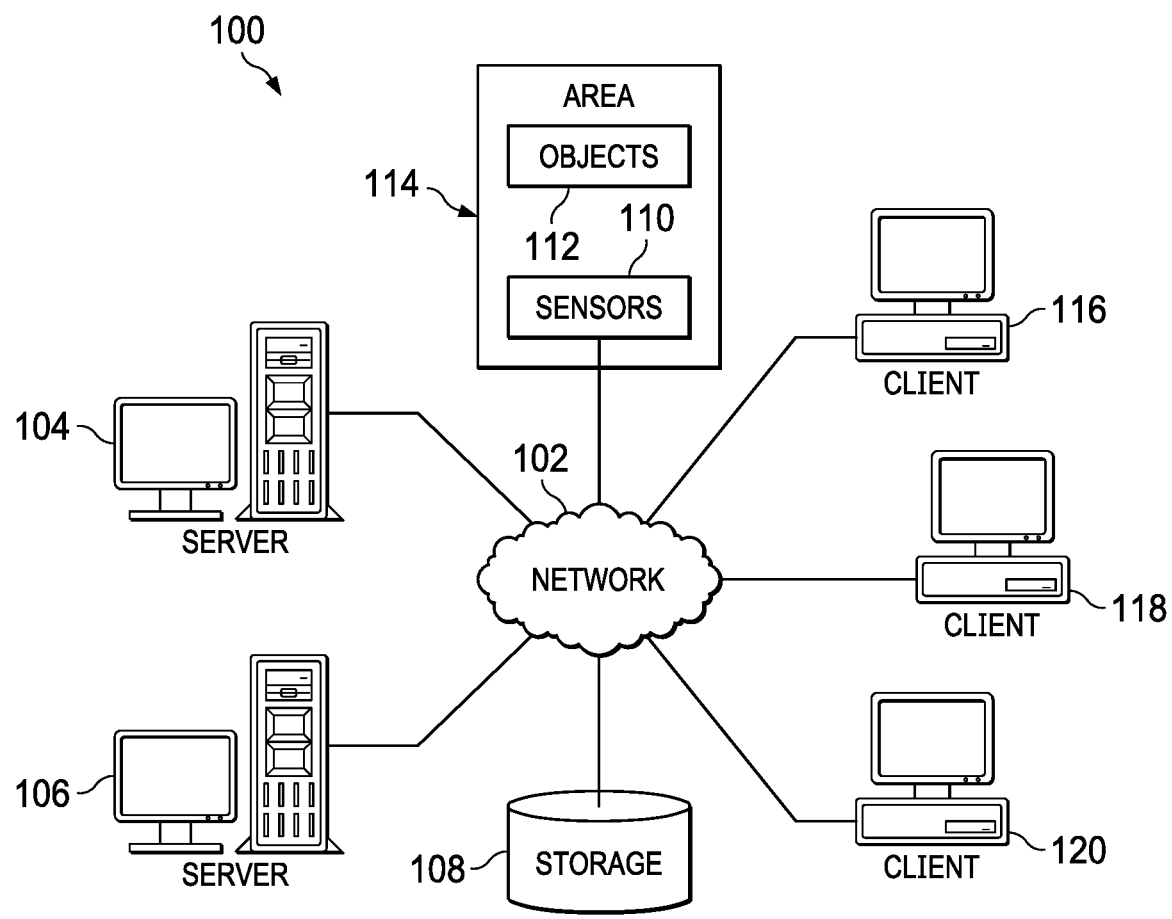
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
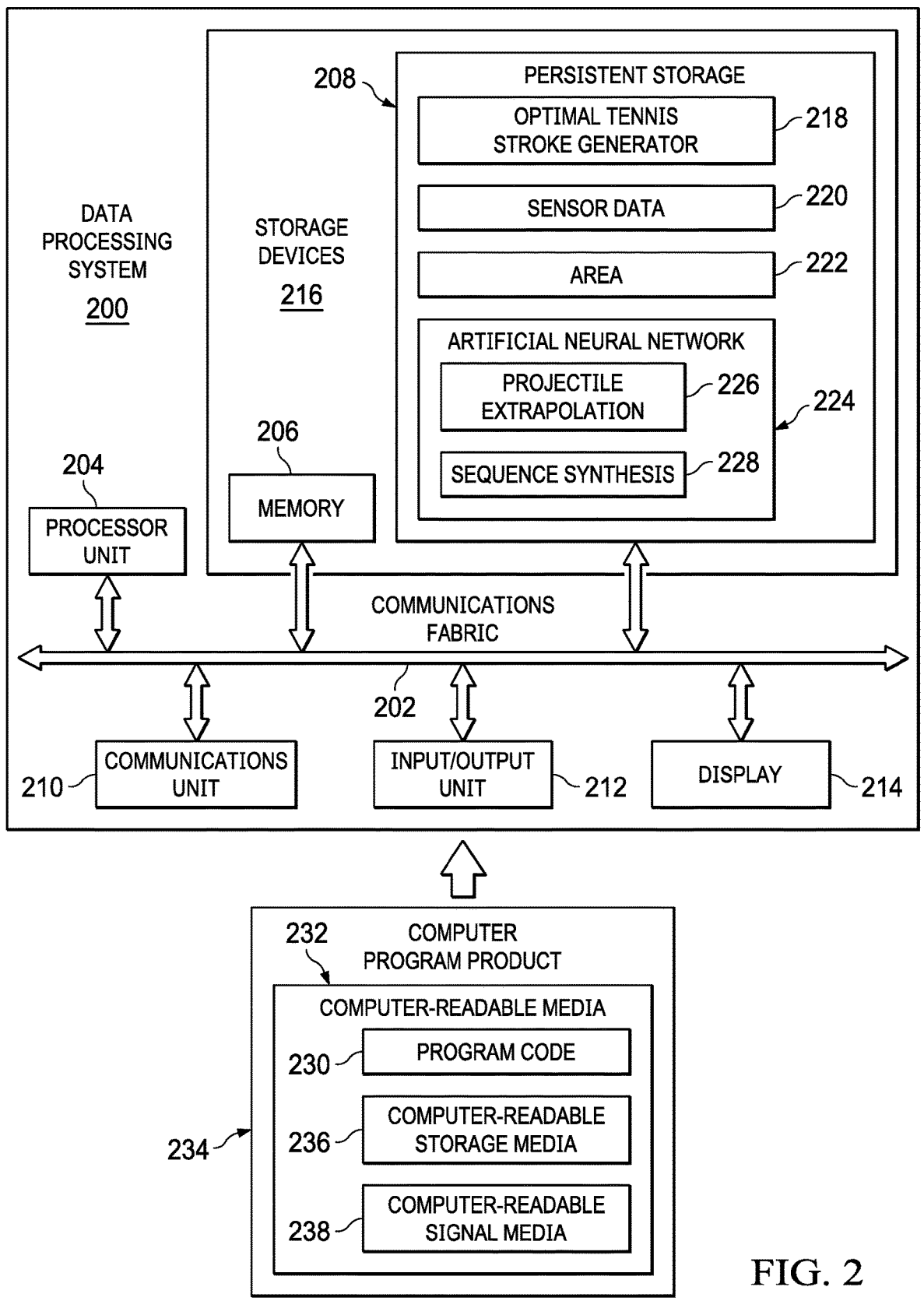
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, sensors, and other devices in which the illustrative embodiments may be implemented. Network data processing system 100 contains network 102, which is the medium used to provide communications links between the computers, data processing systems, sensors, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of services to client devices. For example, server 104 and server 106 may provide projectile extrapolation and alternative sequence synthesis services. Further, server 104 and server 106 may each represent a cluster of servers or may represent servers in a cloud environment.

In this example, server 104 and/or server 106 receive sensor data from sensors 110 regarding objects 112 in area 114. Sensors 110 may include, for example, imaging sensors, such as video cameras, still picture cameras, infrared cameras, and the like, sound capturing sensors, such as microphones, and projectile tracking sensors. Objects 112 may include, for example, people, such as tennis players, inanimate objects, such as tennis balls and tennis rackets, and the like. Area 114 represents a defined area or environment, such as a tennis court, which includes the space within the lines of the tennis court and space immediately adjacent to the tennis court. Server 104 and/or server 106 input the sensor data obtained from sensors 110 into an artificial neural network, such as a convolutional neural network, to perform projectile extrapolation for predicting where a hit tennis ball will land either inside or outside the tennis court. Afterward, server 104 and/or server 106 feed the output of the artificial neural network into a sequence synthesizer, such as a deconvolutional neural network, to generate alternative image sequences of optimal tennis strokes for hitting the tennis ball to win a point.

Client 116, client 118, and client 120 also connect to network 102. Clients 116, 118, and 120 are clients of server 104 and server 106. In this example, clients 116, 118, and 120 are illustrated as desktop or personal computers with wire communication links to network 102. However, it should be noted that clients 116, 118, and 120 are meant as examples only. In other words, clients 116, 118, and 120 may include other types of data processing systems, such as, for example, laptop computers, handheld computers, smart phones, smart watches, smart televisions, and the like, with wire or wireless communication links to network 102. Users of clients 116, 118, and 120 may utilize clients 116, 118, and 120 to access the projectile extrapolation and alternative sequence synthesis services hosted by server 104 and server 106 and view the generated alternative image sequences of optimal tennis strokes. Further, server 104 and server 106 may provide other information, such as applications and programs, to clients 116, 118, and 120.

Storage 108 is a network storage device capable of storing any type of data in a structured format or an unstructured format. In addition, storage 108 may represent a plurality of network storage devices. Further, storage 108 may store identifiers and IP addresses for a plurality of sensors, sensor data, training data, identifiers and IP addresses for a plurality of client devices; identifiers for a plurality of client device users; and the like. Furthermore, storage unit 108 may store other types of data, such as authentication or credential data that may include user names, passwords, and biometric data associated with client device users and system administrators, for example.

In addition, it should be noted that network data processing system 100 may include any number of additional servers, clients, sensors, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 116 over network 102 for use on client 116.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may include a graphics processing unit. Alternatively, data processing system 200 may include a graphics processing unit, in addition to or instead of processor unit 204, coupled to communications fabric 202.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation.

In this example, persistent storage 208 stores optimal tennis stroke generator 218. However, it should be noted that even though optimal tennis stroke generator 218 is illustrated as residing in persistent storage 208, in an alternative illustrative embodiment optimal tennis stroke generator 218 may be a separate component of data processing system 200. For example, optimal tennis stroke generator 218 may be a hardware component coupled to communication fabric 202 or a combination of hardware and software components. In another alternative illustrative embodiment, a first portion of optimal tennis stroke generator 218 may be located in data processing system 200 and a second portion of optimal tennis stroke generator 218 may be located in a second data processing system, such as server 106 in FIG. 1.

Optimal tennis stroke generator 218 controls the process of projectile extrapolation and alternative image sequence synthesis. Optimal tennis stroke generator 218 receives sensor data 220 from a set of sensors in area 222. The set of sensors in area 222 may be, for example, sensors 110 in area 114 in FIG. 1. Sensor data 220 may be, for example, image data, such as video clips, sound data, such as audio sequences, and projectile tracking data, such as tennis ball and player coordinates, which correspond to objects in area 222. The objects may be, for example, objects 112 in FIG. 1.

Optimal tennis stroke generator 218 inputs sensor data 220 into artificial neural network 224. It should be noted that artificial neural network 224 may represent a set of one or more artificial neural networks of a same type or a set of two or more different types of artificial neural networks, such as, for example, a convolutional neural network, a deconvolutional neural network, and a residual neural network. In addition, the set of artificial neural networks may execute in sequence and/or in parallel.

Artificial neural network 224 is a data processing algorithm. In an alternative illustrative embodiment, artificial neural network 224 is a hardware processing device. Artificial neural network 224 is organized in layers. The layers are made up of a number of interconnected nodes that contain an activation function. An activation function of a node defines the output of that node given the input. Data patterns, such as sensor data 220, are presented to artificial neural network 224 via an input layer, which communicates to one or more hidden layers where the actual processing is done via a system of weighted connections. The hidden layers are internal representations of incoming data. The hidden layers then link to an output layer where the answer is output.

Artificial neural network 224 modifies the weights of the connections according to the input data patterns that it is presented with. Artificial neural network 224 learns via a supervised process that occurs with each cycle (i.e., each time artificial neural network 224 is run with a new input data pattern) through a forward activation flow of outputs, and the backpropagation of weight adjustments. In other words, this is a two-step process where the inputs are fed into artificial neural network 224 via forward propagation and multiplied with initially random weights and biases before they are transformed via an activation function. Once the forward propagation is complete, the backpropagation step measures the error from the final output to the expected output by calculating the partial derivatives of the weights generating the error and adjusts them. In other words, backpropagation adjusts the weights by calculating the gradient of a loss function. Once the weights are adjusted, artificial neural network 224 repeats the process of the forward propagation and backpropagation steps to minimize the error rate until convergence.

More simply, when artificial neural network 224 is initially presented with a training data pattern, artificial neural network 224 makes a random guess as to what it might be. Artificial neural network 224 then determines how far its answer was from the actual one and makes an appropriate adjustment to its connection weights. Within each hidden layer node is an activation function, such as a sigmoid function, linear function, or rectified linear unit, which polarizes network activity and helps it to stabilize. Once artificial neural network 224 is trained, optimal tennis stroke generator 218 utilizes artificial neural network 224 as an analytical tool to perform projectile extrapolation 226 and sequence synthesis 228.

Projectile extrapolation 226 predicts or determines path information, such as position (e.g., height, depth, and width within area 222), velocity, rotation, and the like, corresponding to a projectile, such as a tennis ball, based on analysis of sensor data 220, which may include one or more of video, audio, and projectile data. Sequence synthesis 228 generates a set of one or more alternative image sequences showing a set of one or more optimal or user-preferred tennis strokes to hit the tennis ball based on an output of projectile extrapolation 226. An optimal tennis stroke is one that increases a probability of a tennis player winning a point in a tennis game as compared to the actual tennis stroke taken by the tennis player to hit the tennis ball during the point.

Communications unit 210, in this example, provides for communication with other computers, data processing systems, sensors, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra-high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 230 is located in a functional form on computer readable media 232 that is selectively removable and may be loaded onto or transferred to data processing system 200 for running by processor unit 204. Program code 230 and computer readable media 232 form computer program product 234. In one example, computer readable media 232 may be computer readable storage media 236 or computer readable signal media 238. Computer readable storage media 236 may include, for example, an optical or magnetic disc that is inserted or placed into a drive or other device that is part of persistent storage 208 for transfer onto a storage device, such as a hard drive, that is part of persistent storage 208. Computer readable storage media 236 also may take the form of a persistent storage, such as a hard drive, a thumb drive, or a flash memory that is connected to data processing system 200. In some instances, computer readable storage media 236 may not be removable from data processing system 200.

Alternatively, program code 230 may be transferred to data processing system 200 using computer readable signal media 238. Computer readable signal media 238 may be, for example, a propagated data signal containing program code 230. For example, computer readable signal media 238 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 230 may be downloaded over a network to persistent storage 208 from another device or data processing system through computer readable signal media 238 for use within data processing system 200. For instance, program code stored in a computer readable storage media in a data processing system may be downloaded over a network from the data processing system to data processing system 200. The data processing system providing program code 230 may be a server computer, a client computer, or some other device capable of storing and transmitting program code 230.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 236 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

As an object moves through space, where the object will land or come to rest is generally wanted to be known. Currently, precise measuring tools do not exist to apply the laws of physics to arrive at a mathematically sound conclusion as to where the object will land or come to rest. Instead, a generalization or guess is currently made as to where the object will land or come to rest.

As an example, a tennis player will select the best type of stroke during play to increase the tennis player's chances of winning a point. To win the point in one scenario, the ball must bounce within a certain area of the court and be non-returnable. Through training, the tennis player learns what kind of stroke to take and the power needed to hit the ball to win the point. In another example, a driver of a vehicle learns how sensitive the vehicle's brakes are overtime. Through driver's training, driving school, and actual driving experience, the driver learns when to apply the brake and how hard to press the brake pedal to prevent a collision with another vehicle or object, such as a person, animal, or tree.

Automatically detecting where the object, which is traveling at a velocity, will land or come to rest using video alone has not been achieved currently. However, illustrative embodiments may speed up the training process or guide a user during operations involving moving objects (e.g., projectiles, such as tennis balls), by generating operation sequence images and displaying those operation sequence images to the user. In other words, illustrative embodiments display the optimal sequence of images for the user-desired outcome to aid the user in the decision-making process.

Illustrative embodiments determine a projectile's position and movement in space, such as velocity, rotation, and other relevant parameters, along with the user's characteristics based on a sequence of images and accompanying audio of a video capturing the projectile and user. Illustrative embodiments also may obtain user characteristics via sensors and biometric wearables on the user and/or thermographic images of the user. Further, illustrative embodiments may obtain characteristics, such as position and velocity, of an object utilized by the user, such as a tennis racket, via sensors in or on the object.

When illustrative embodiments determine the end state of the projectile, the user may then understand the consequence of the user's interaction with the projectile. In addition, illustrative embodiments may explore alternative user interactions with the projectile and expected outcomes of the alternative interactions through synthesis of alternative image sequences (e.g., generation of alternative videos, generation of alternative animations, generation of alternative static or dynamic video overlays, and the like) so that the user can view the alternative interactions. For example, a tennis player, who is in training, may watch a video of the tennis player's play containing sequences of images of generated alternative strokes to understand what may have happened during play for each stroke of each point. As a result of using illustrative embodiments, the tennis player may quickly learn what kind of strokes to take in different scenarios to optimize point outcomes.

Illustrative embodiments obtain the end state of a projectile by modeling the laws of physics. Furthermore, illustrative embodiments generate multiple sequences of images based on the neighborhood of projectile end states. Illustrative embodiments perform image sequence synthesis from projectile motion points; image sequence synthesis from sound features; image sequence synthesis from projectile motion points and sound features; object motion point extrapolation from sequences of images; positional data synthesis based on sequences of images; exploration of alternative user actions through positional data synthesis;

optimization of alternative user actions through positional data synthesis; raw juxtaposition of synthesized sequence of images onto a training model with sound and synthesized positions; sequential merging of sequences of images based on timestamp; sequential merging of sound based on timestamp; and classification of user behavior based on sound features.

Illustrative embodiments process raw video data to generate projectile information, as well as user (e.g., tennis player) and opponent information. Illustrative embodiments segment the video based on sound and projectile tracking system data to identify video frames that relate to a tennis player's stroke. Illustrative embodiments feed the identified sequences of images into a convolutional neural network, in parallel, for feature detection. A final feed forward layer of the convolutional neural network integrates the relationship of frames and motions to determine, for example, ball velocity, racket velocity, contact angle, ball rotation direction and speed, distance travelled by player, and ball travel across three dimensions: height, length, and width within the court.

Then, illustrative embodiments take the projectile and user information output of the convolutional neural network and feed it into a deconvolutional neural network (i.e., image sequence generator) to generate stroke options that the user may utilize to win a point in the tennis match. Given characteristics of the scenario (e.g., user (i.e., tennis player) position, opponent position, velocity and angle of incoming projectile (i.e., ball), contact height, and the like), illustrative embodiments evaluate multiple ground stroke options for effectiveness and output optimal stroke selections. Illustrative embodiments compare the projectile output with these optimal stroke selections to find deltas between the optimal player positions on the court to win a point and the player's current actions.

Illustrative embodiments calculate a spread of features so that illustrative embodiments may generate several alternative series of images. Further, illustrative embodiments may include contextual information, such as, for example, sound, to enhance classification of ground stroke type based on the sound of contact and so that illustrative embodiments may integrate the style of play of the user into synthesis of the image sequence. In other words, illustrative embodiments may determine the power of a player hitting a ball and emotional state of the player through collected sound data during play.

Figure 3:
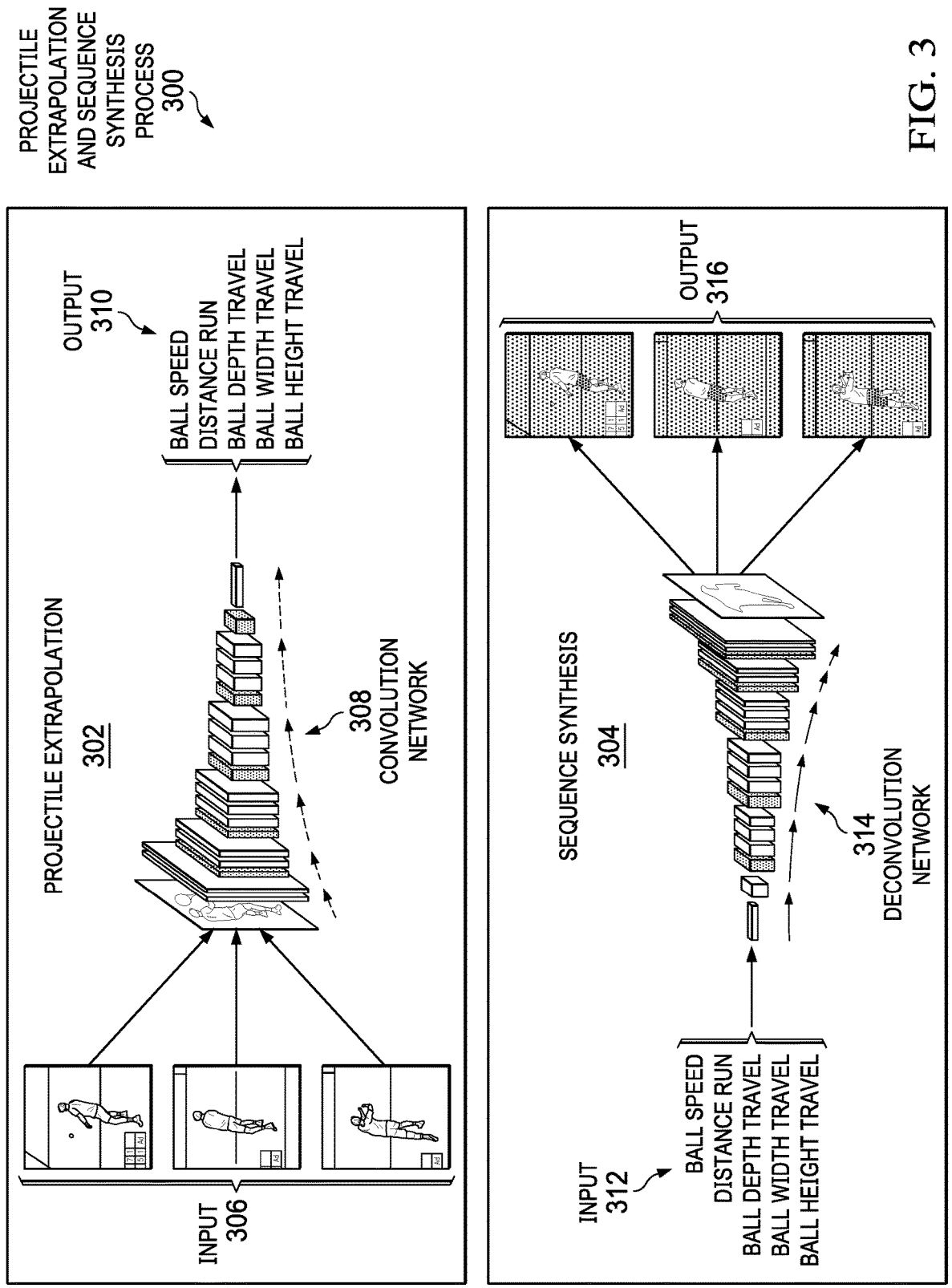
FIG. 3 is a diagram illustrating an example of a projectile extrapolation and sequence synthesis process in accordance with an illustrative embodiment.

With reference now to FIG. 3, a diagram illustrating an example of a projectile extrapolation and sequence synthesis process is depicted in accordance with an illustrative embodiment. Projectile extrapolation and sequence synthesis process 300 may be implemented in a computer, such as, for example, server 104 in FIG. 1 or data processing system 200 in FIG. 2. Projectile extrapolation and sequence synthesis process 300 includes projectile extrapolation 302 and sequence synthesis 304. Projectile extrapolation 302 and sequence synthesis 304 may be, for example, projectile extrapolation 226 and sequence synthesis 228 in FIG. 2.

In this example, projectile extrapolation and sequence synthesis process 300 feeds input 306 into convolutional neural network 308 to generate output 310 of projectile extrapolation 302. In this example, input 306 is a series of digital video images of a tennis player during a point. Convolution neural network 308 is a type or class of artificial neural network, such as artificial neural network 224 in FIG. 2, that processes and analyzes the digital video images of input 306. Convolution neural network 308 consists of an input layer and an output layer, as well as multiple hidden layers. The hidden layers consist of convolution layers, pooling layers, and fully connected layers.

Convolution layers apply a convolution operation to input 306, passing the result to the next layer. A convolution layer reduces the number of parameters by only processing a small patch, portion, or data cube of the entire image. Convolution neural network 308 randomly selects the small patch from the image for processing based on applied filters. The reason for randomly selecting only a patch within the entire image is that features in one patch are likely to be useful for other patches, thus, reducing computational cost to the computer by decreasing a need for processor resources. Each node in the convolution layers processes image data for only its respective patch or receptive field to extract features. In other words, each node will only process a small contiguous region of pixels in input 306.

Pooling layers combine the outputs of node clusters at one layer into a single node in the next layer. For example, max pooling uses the maximum value from the cluster of nodes at the prior layer. As another example, average pooling uses an average value from the cluster of nodes at the prior layer. Each node in the pooling layers combines outputs from the convolution layers to produce a single output to the next layer. In other words, the pooling layers aggregate features together to generate better features for classification.

Fully connected layers connect every node in one layer to every node in a next layer to generate forecasted values. Convolution neural network 308 shares weights in convolutional layers, which means that the same filter is used for each patch (e.g., receptive field) in the layer. This reduces memory footprint and improves computer performance.

In addition, projectile extrapolation and sequence synthesis process 300 may optionally feed the forecasted values into a residual neural network, which is another type or class of artificial neural network. The residual neural network utilizes short cuts to jump over layers. Motivation for skipping layers is to avoid the problem of vanishing gradients by reusing activation from a previous layer until the next to the current one has learned its weight. In other words, this skipping process forces the residual neural network to recall previously learned information by pushing forecasted weights forward. However, it should be noted that the residual neural network is a fully connected neural network and consists of symmetric layers having substantially the same number of nodes so that a level of forecasting will not be forgotten.

In this example, output 310 includes ball speed, distance run by the tennis player to ball, ball depth travel, ball width travel, and ball height travel in the tennis court. However, it should be noted that output 310 is only meant as an example. In other words, output 310 may include other types of information, such as tennis racket position, tennis racket speed, tennis player position, opponent tennis player position, and the like.

In this example, projectile extrapolation and sequence synthesis process 300 feeds input 312 into deconvolutional neural network 314 to generate output 316 of sequence synthesis 304. It should be noted that input 312 is the same as output 310. In other words, the output of projectile extrapolation 302 is the input of sequence synthesis 304. Deconvolutional neural network 314 is another type or class of artificial neural network. Deconvolutional neural network 314 operates in a reverse manner as convolution neural network 308 by using deconvolution and depooling layers to produce output 316.

Output 316 is a set of one or more alternative image sequences. The set of alternative image sequences may be, for example, a video or an overlay for a video generated by the computer. The set of alternative image sequences include a set of one or more optimal tennis strokes for hitting the tennis ball to increase a likelihood of winning a point. The computer may display output 316 on a client device corresponding to the tennis player.

Figure 4:
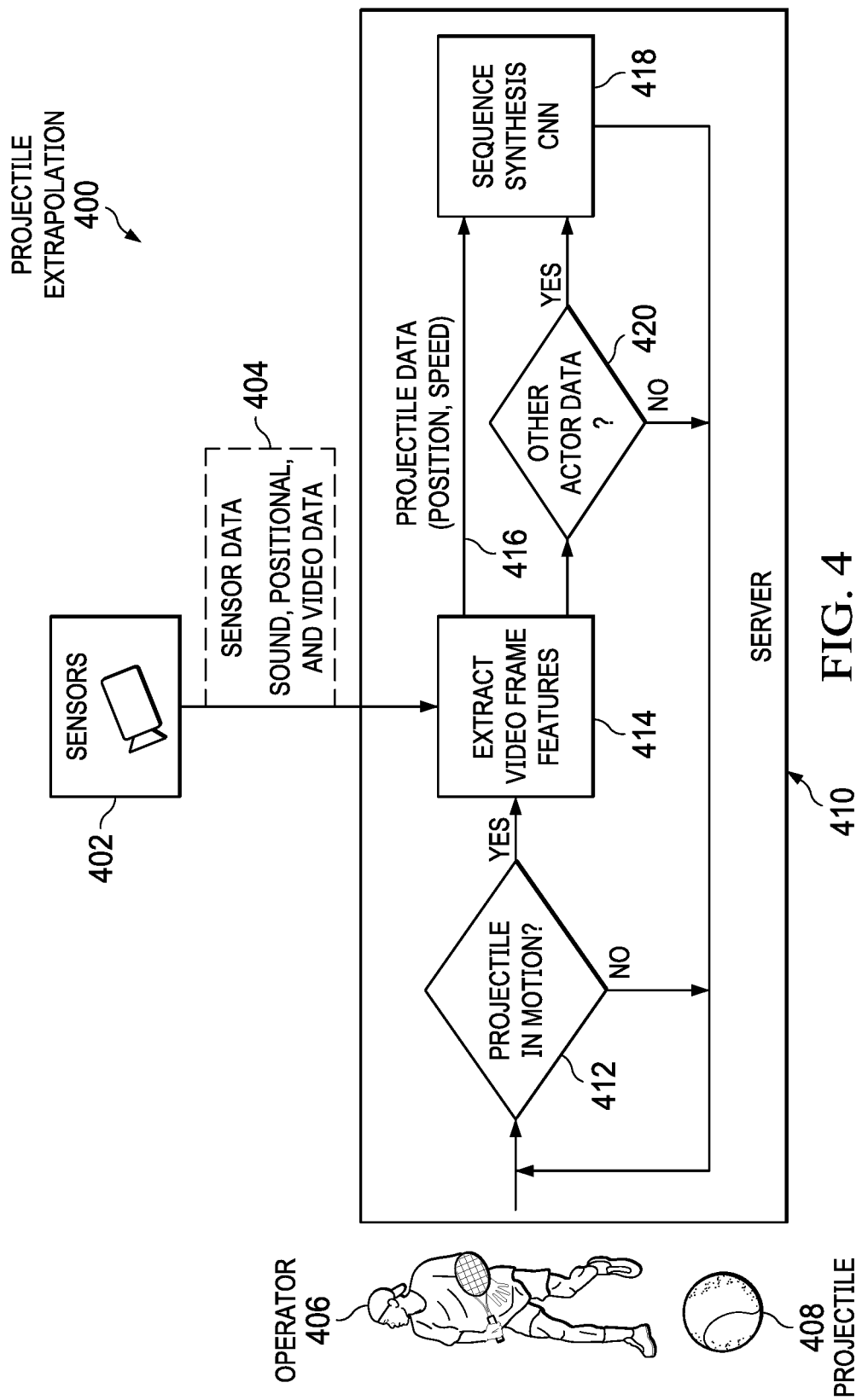
FIG. 4 is a diagram illustrating an example of projectile extrapolation in accordance with an illustrative embodiment.

With reference now to FIG. 4, a diagram illustrating an example of projectile extrapolation is depicted in accordance with an illustrative embodiment. In this example, projectile extrapolation 400 includes sensors 402, sensor data 404, operator 406, projectile 408, and server 410. Sensors 402 capture sensor data 404, which correspond to operator 406 and projectile 408 in a defined area, location, or environment, such as a tennis court. Sensor data 404 may include, for example, sound, positional, and video data. Operator 406 and projectile 408 may be, for example, a tennis player and a tennis ball, respectively. Server 410 may be, for example, server 104 in FIG. 1 or data processing system 200 in FIG. 2.

At 412, server 410 makes a determination as to whether projectile 408 is in motion. If server 410 determines that projectile 408 is not in motion, then server 410 waits for projectile 408 to go into motion. If server 410 determines that projectile 408 is in motion, then server 410 extracts video frame features from sensor data 404 at 414 using, for example, a convolutional neural network, such as convolutional neural network 308 in FIG. 3. At 416, server 410 inputs projectile data, such as, for example, projectile position and speed, into sequence synthesis deconvolutional neural network 418. Sequence synthesis deconvolutional neural network 418 may be, for example, deconvolutional neural network 314 in FIG. 3.

In addition, at 420, server 410 makes a determination as to whether other actor data is available in the extracted video frame features. If server 410 determines that other actor data is not available, then server 410 waits for projectile 408 to go into motion again. If server 410 determines that other actor data is available, then server 410 inputs the other actor data into sequence synthesis deconvolutional neural network 418. Thereafter, server 410 waits for projectile 408 to go into motion again.

Figure 5:
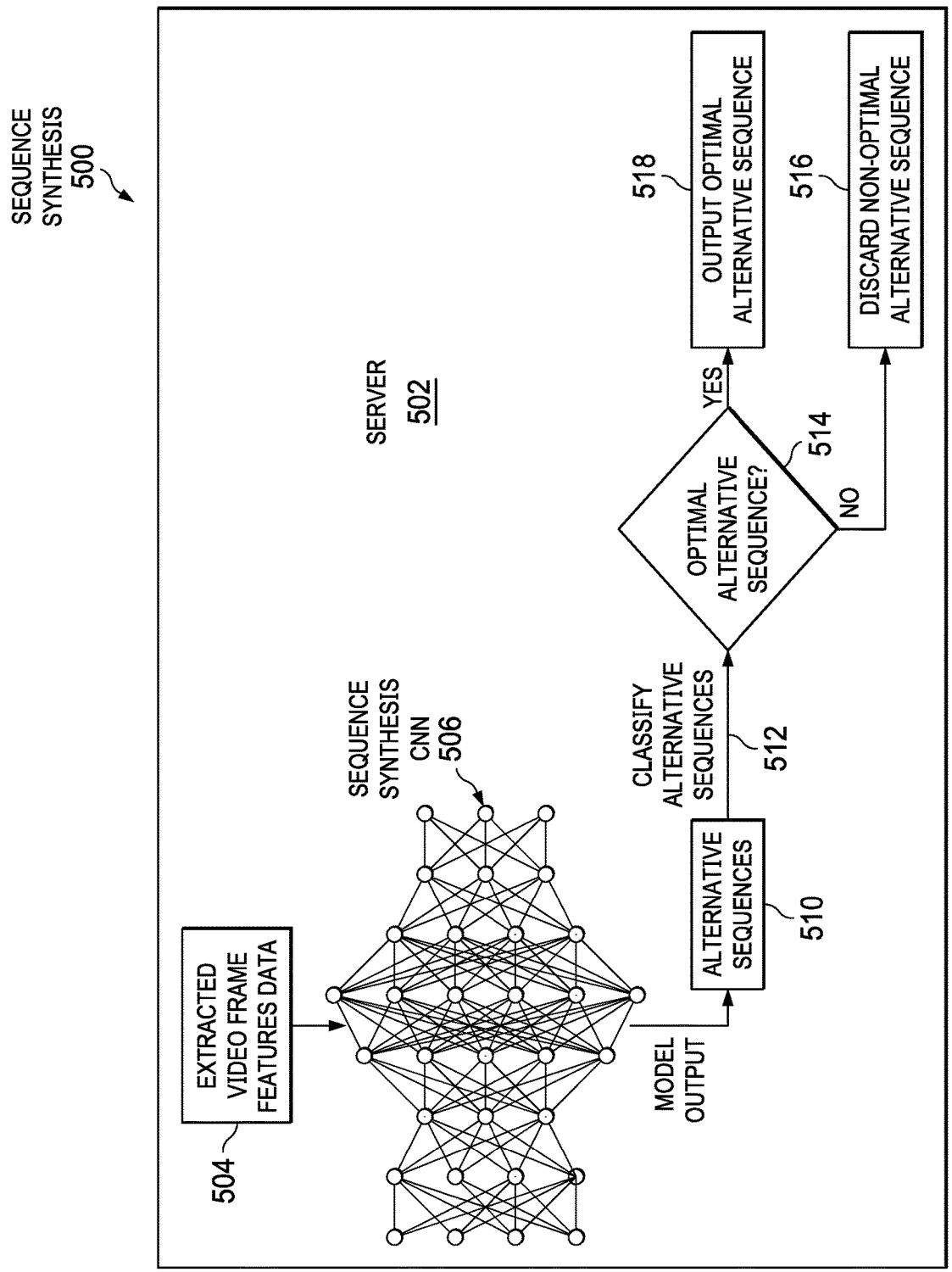
FIG. 5 is a diagram illustrating an example of sequence synthesis in accordance with an illustrative embodiment.

With reference now to FIG. 5, a diagram illustrating an example of sequence synthesis is depicted in accordance with an illustrative embodiment. Sequence synthesis 500 utilizes server 502. Server 502 may be, for example, server 410 in FIG. 4. Server 502 inputs extracted video frame features data 504 into sequence synthesis deconvolutional neural network 506. Sequence synthesis deconvolutional neural network 506 may be, for example, sequence synthesis deconvolutional neural network 418 in FIG. 4.

Output of sequence synthesis deconvolutional network 506 is alternative sequences 510. Alternative sequences 510 are a set of alternative image sequences showing a set of optimal tennis strokes. At 512, server 502 classifies each alternative image sequence in the set of alternative image sequences.

At 514, server 502 makes a determination as to whether a classified alternative image sequence is optimal. If server 502 determines that a particular classified alternative image sequence is not optimal, then server 502 discards that non-optimal alternative image sequence at 516. If server 502 determines that a particular classified alternative image sequence is optimal, then server 502 outputs the optimal alternative image sequence to a client device at 518.

Figure 6:
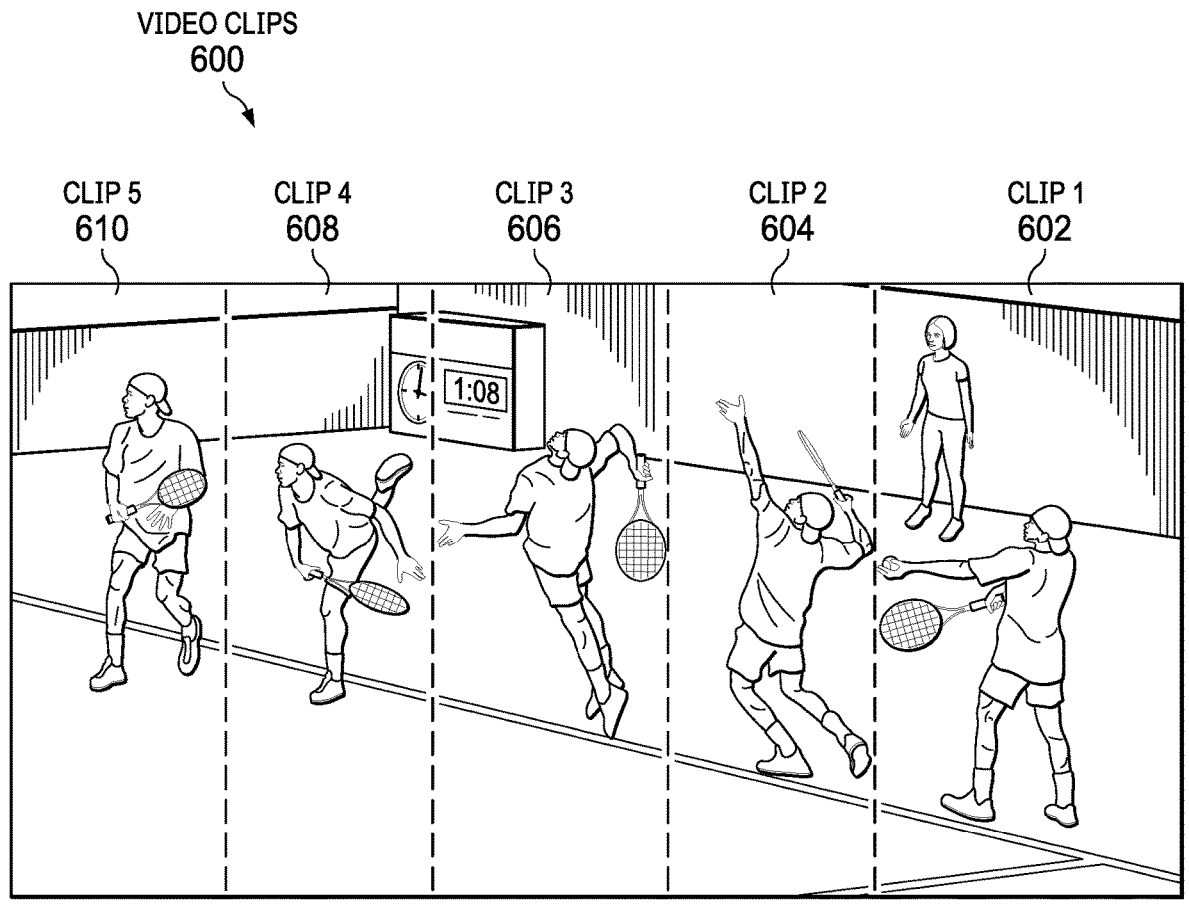
FIG. 6 is a diagram illustrating an example of video clips in accordance with an illustrative embodiment.

With reference now to FIG. 6, a diagram illustrating an example of video clips is depicted in accordance with an illustrative embodiment. Video clips 600 are composed of multiple frames showing how a tennis player strikes a tennis ball. In this example, video clips 600 include clip 1 602, clip 2 604, clip 3 606, clip 4 608, and clip 5 610 showing different stages of the tennis player serving the tennis ball to start a point. Illustrative embodiments segment the video and tag the segments with ground truth data obtained from a projectile tracking system. Ground truth refers to information obtained by direct observation (i.e., empirical evidence) as opposed to information provided by inference. The projectile tracking system data provides projectile information corresponding to each possible stroke in one or more tables, such as table 612 and table 614. Illustrative embodiments evaluate the tennis strokes using the table data, select optimal tennis strokes, and then generate image sequences of alternative optimal tennis strokes for the tennis player user.

Figure 7:
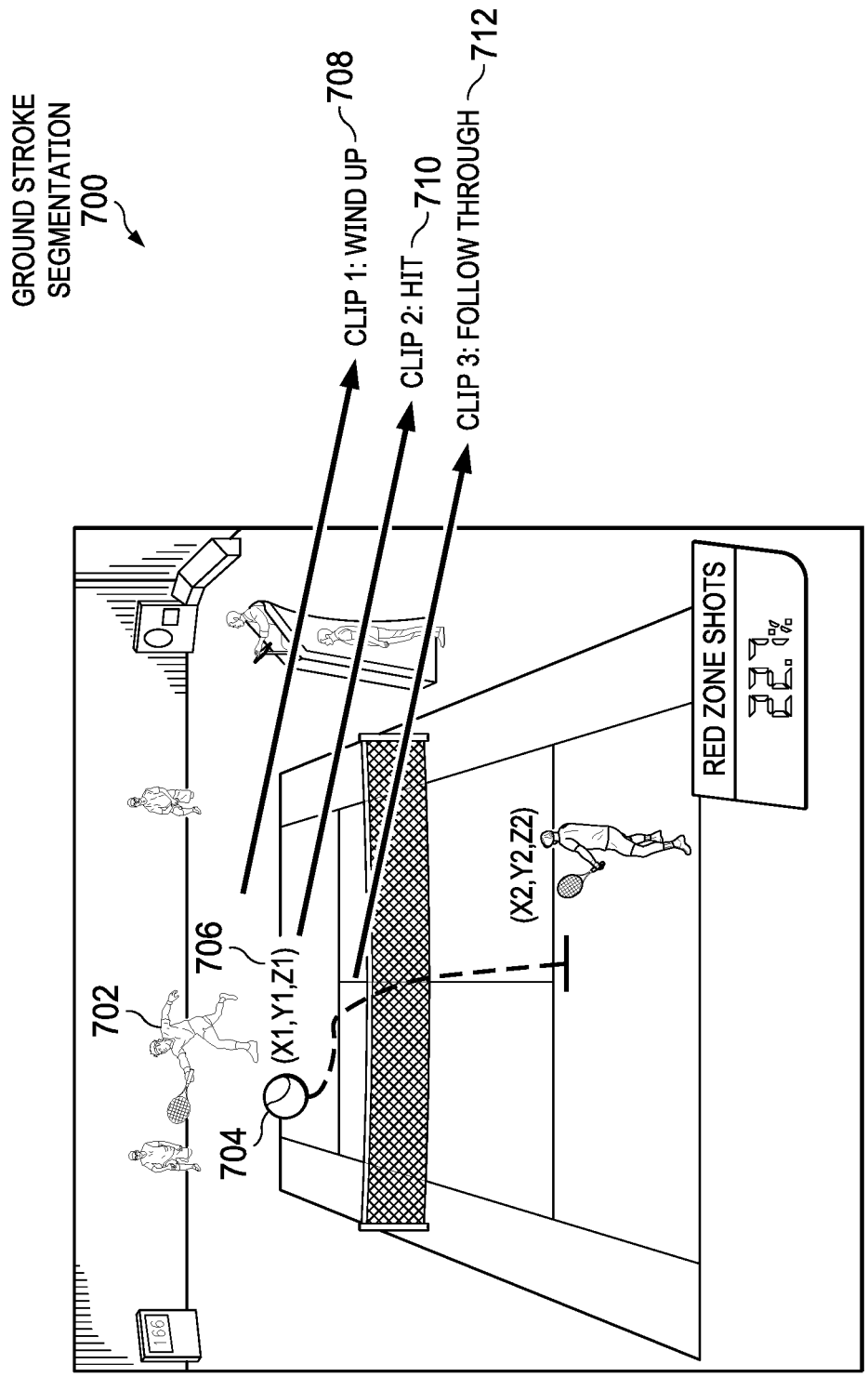
FIG. 7 is a diagram illustrating an example of ground stroke segmenting in accordance with an illustrative embodiment.

With reference now to FIG. 7, a diagram illustrating an example of ground stroke segmenting is depicted in accordance with an illustrative embodiment. Ground stroke segmenting 700 corresponds to tennis player 702 preparing to hit tennis ball 704, which is currently located at coordinates X1, Y1, Z1 706. Coordinates X1, Y1, Z1 may represent position of tennis ball 704 with regard to height, depth, and width of tennis ball 704 within the tennis court.

Illustrative embodiments segment the stroke, such as, for example, wind up 708 in clip 1, ball hit 710 in clip 2, and follow through 712 in clip 3, of tennis player 702. Illustrative embodiments also utilize racket detection, length of point, point time stamp, projectile tracking, and court lines to generate images from the stroke. In addition, illustrative embodiments utilize ball contact sounds and player emitted sounds as inputs to segment the strokes of each player.

Figure 8:
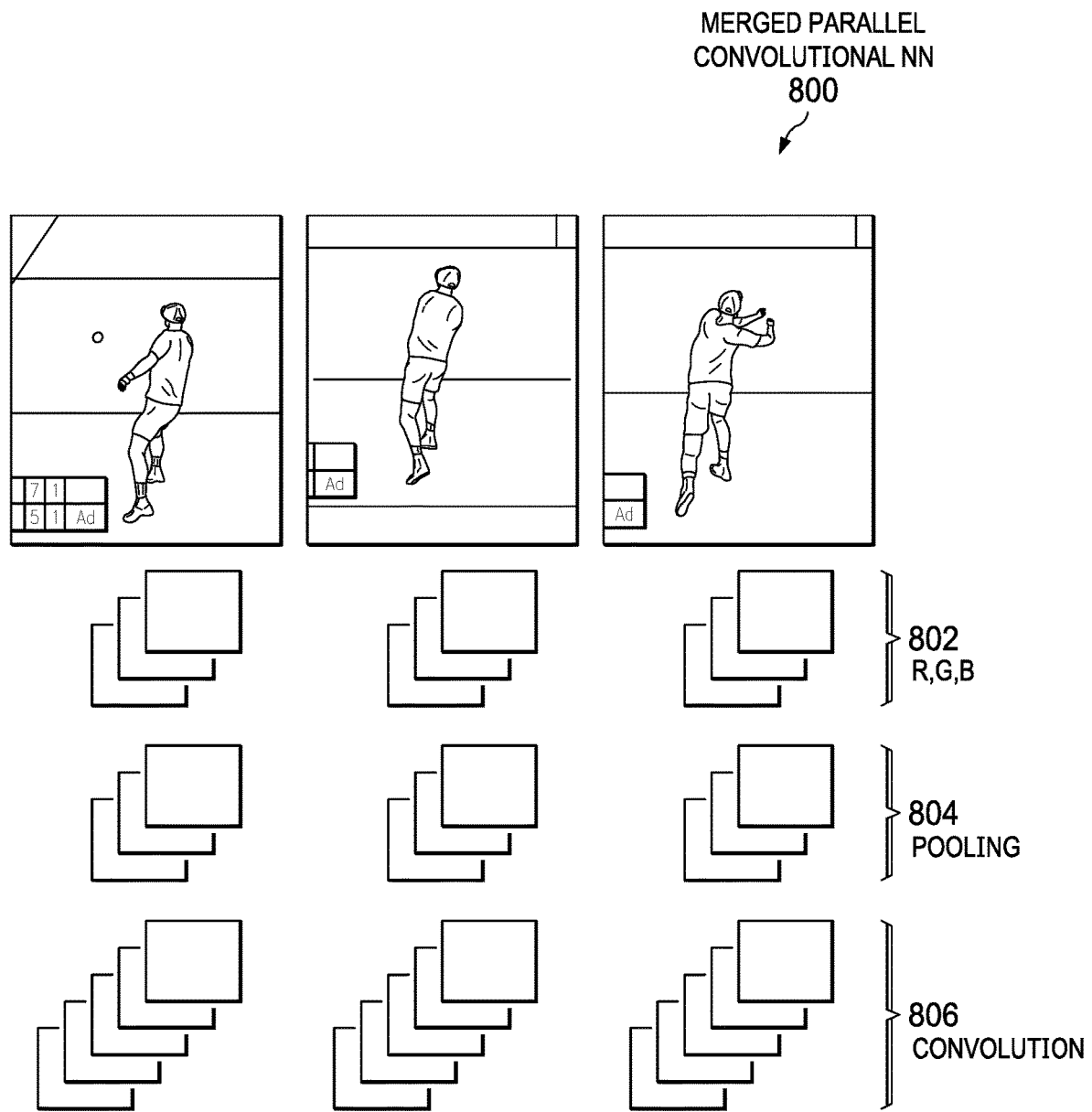
FIG. 8 is a diagram illustrating an example of a merged parallel convolutional neural network in accordance with an illustrative embodiment.

With reference now to FIG. 8, a diagram illustrating an example of a merged parallel convolutional neural network is depicted in accordance with an illustrative embodiment. Merged parallel convolutional neural network 800 illustrates parallel processing of multiple video clips of a tennis player. In this example, merged parallel convolutional neural network 800 processes in parallel at a same time three video clips representing wind up (pre-stroke), ball hit (during stroke), and follow through (post-stroke) sequences, respectively, of the tennis player hitting a tennis ball with a tennis racket. Illustrative embodiments input these wind up, ball hit, and follow through sequences into R,G,B layers 802, pooling layers 804, and convolutional layers 806 of merged parallel convolutional neural network 800 to detect features. The final feed forward layers integrate the relationships of the three video clips together. The merging happens sequentially so that the time order of the strokes is taken into account. The final output is projectile tracking system-like positional data.

Figure 9:
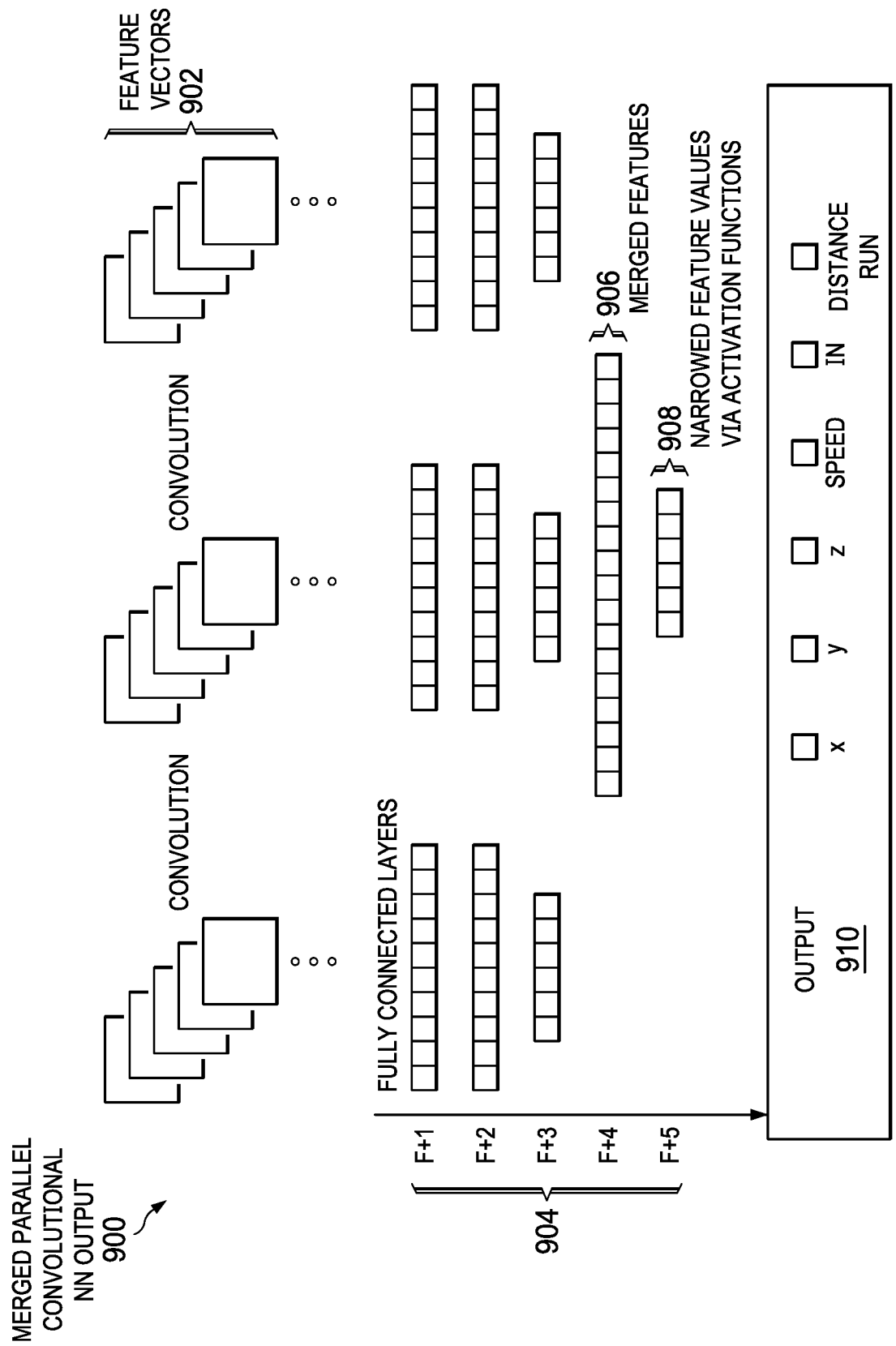
FIG. 9 is a diagram illustrating an example of merged parallel convolutional neural network output in accordance with an illustrative embodiment.

With reference now to FIG. 9, a diagram illustrating an example of merged parallel convolutional neural network output is depicted in accordance with an illustrative embodiment. Merged parallel convolutional neural network output 900 shows feature vectors 902 as input to fully connected layers 904. In this example, fully connected layers 904 include fully connected layers 1-5. However, it should be noted that alternative illustrative embodiments may include any number of fully connected layers.

Fully connected layer 4 illustrates merged features 906. Fully connected layer 5 illustrates a set of narrowed feature values via activation functions 908. Output 910 of the merged parallel convolutional neural network provides information, such as ball position or coordinates (e.g., X, Y, Z), ball speed, whether the ball was "in" or "out", and distance run by the tennis player based on the set of narrowed feature values.

Figure 10:
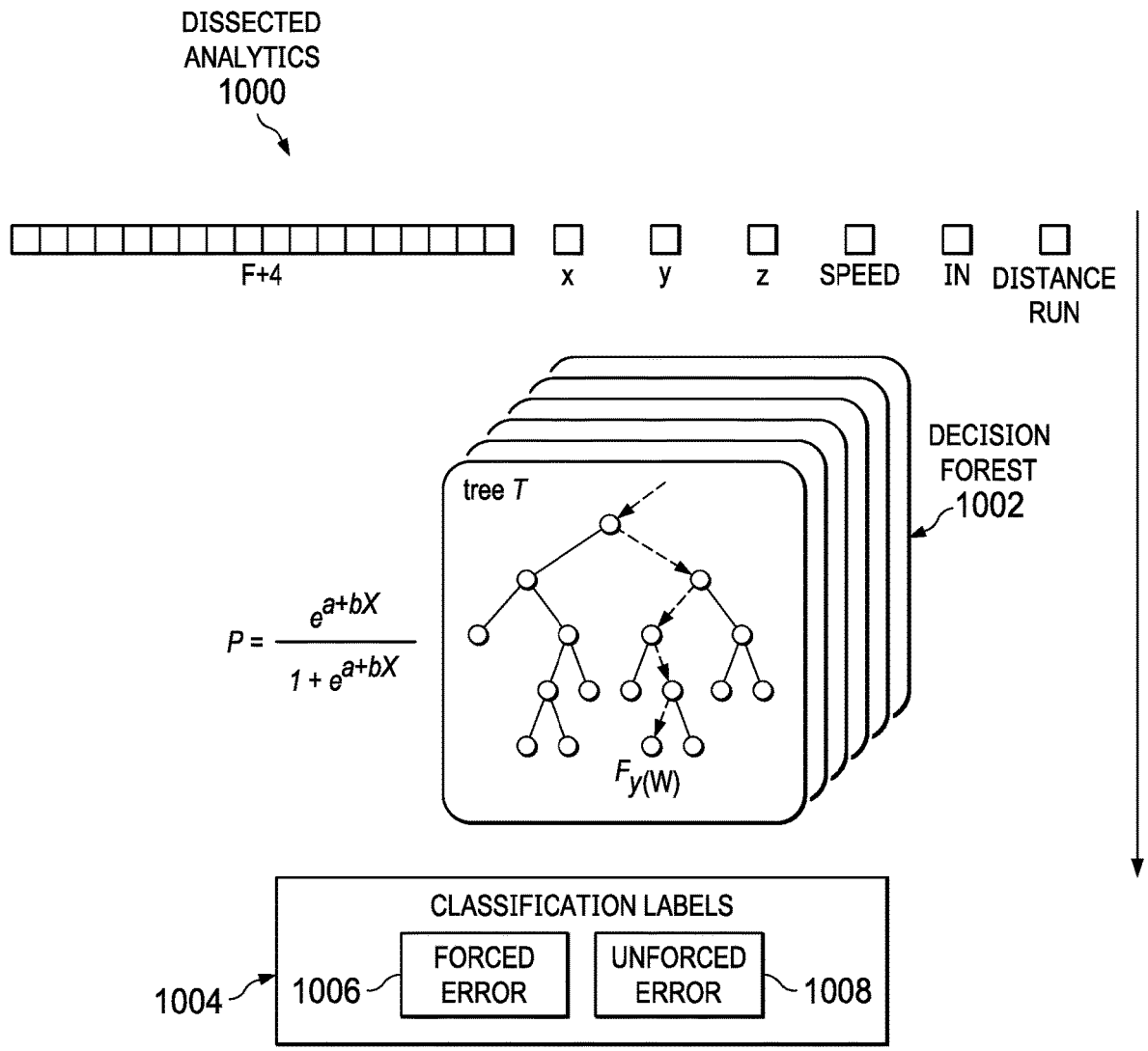
FIG. 10 is a diagram illustrating an example of dissected analytics in accordance with an illustrative embodiment.

With reference now to FIG. 10, a diagram illustrating an example of dissected analytics is depicted in accordance with an illustrative embodiment. Dissected analytics 1000 illustrates how illustrative embodiments utilize decision forest 1002 to make decisions as to what a tennis player should do based on information in a merged parallel convolutional neural network output, such as merged parallel convolutional neural network output 900 in FIG. 9. Illustrative embodiments label the output of the final feed forward layers using classification labels 1004 so that illustrative embodiments may utilize traditional analytics to classify whether a tennis stroke is, for example, a forced error, such as forced error 1006, or an unforced error, such as unforced error 1008. Classification labels 1004 assist illustrative embodiments in determining which layer activation outputs are combined with the projectile extrapolation information for classification. Thus, illustrative embodiments explore different tennis stroke options using decision trees in decision forest 1002.

Figure 11:
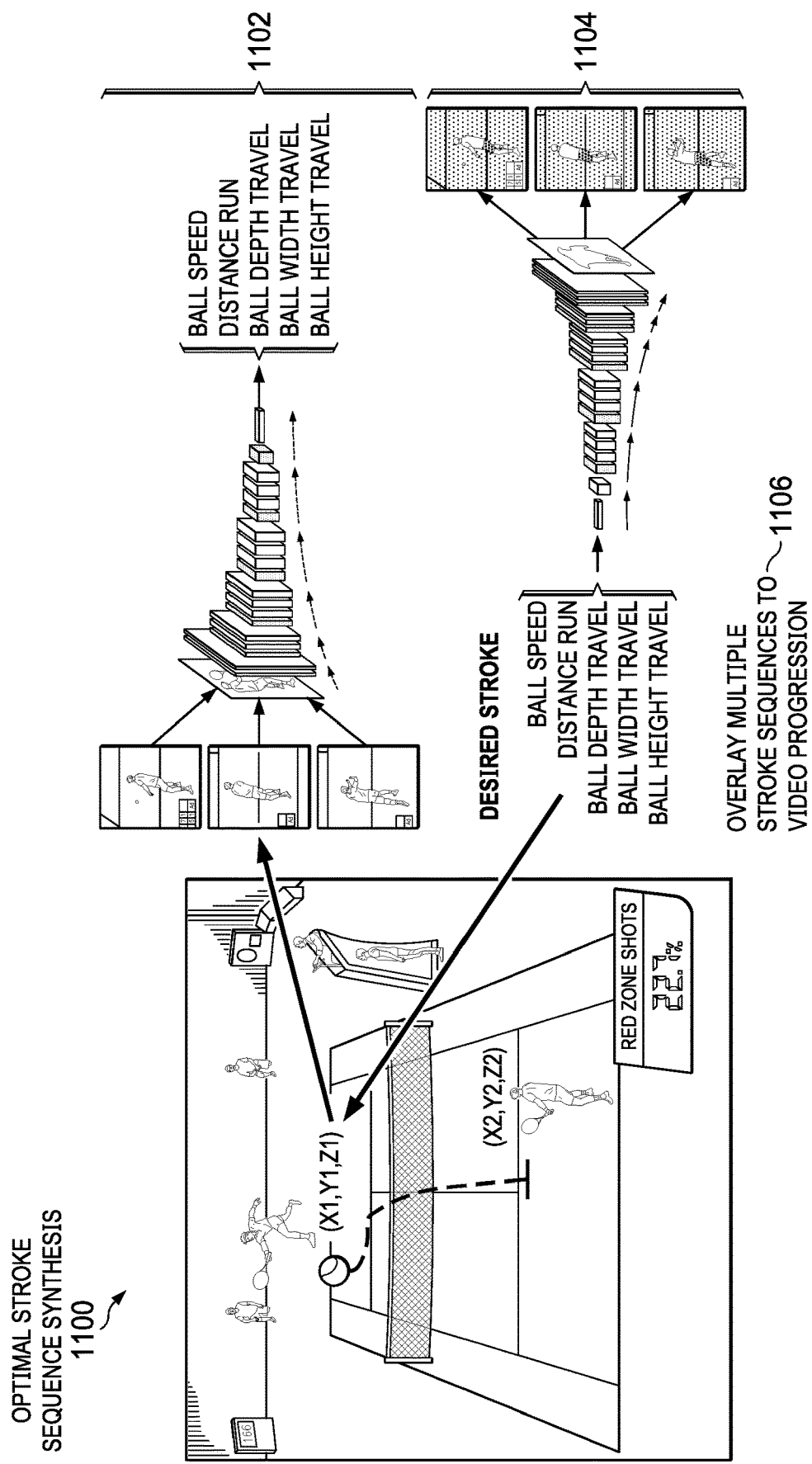
FIG. 11 is a diagram illustrating an example of optimal stroke sequence synthesis in accordance with an illustrative embodiment.

With reference now to FIG. 11, a diagram illustrating an example of optimal stroke sequence synthesis is depicted in accordance with an illustrative embodiment. Optimal stroke sequence synthesis 1100 illustrates convolutional neural network 1102 generating projectile information and inputting the projectile information into deconvolutional neural network 1104 to generate a set of one or more optimal tennis stroke overlays, such as overlay multiple stroke sequences to video progression 1106. In addition, illustrative embodiments may paint or draw the set of optimal tennis strokes based on determined projectile information. Further, illustrative embodiments may overlay an alternative sequence of images of the set of optimal tennis strokes onto a training video. Furthermore, illustrative embodiments may generate multiple types of alternative tennis strokes for the tennis player to use.

Figure 12:
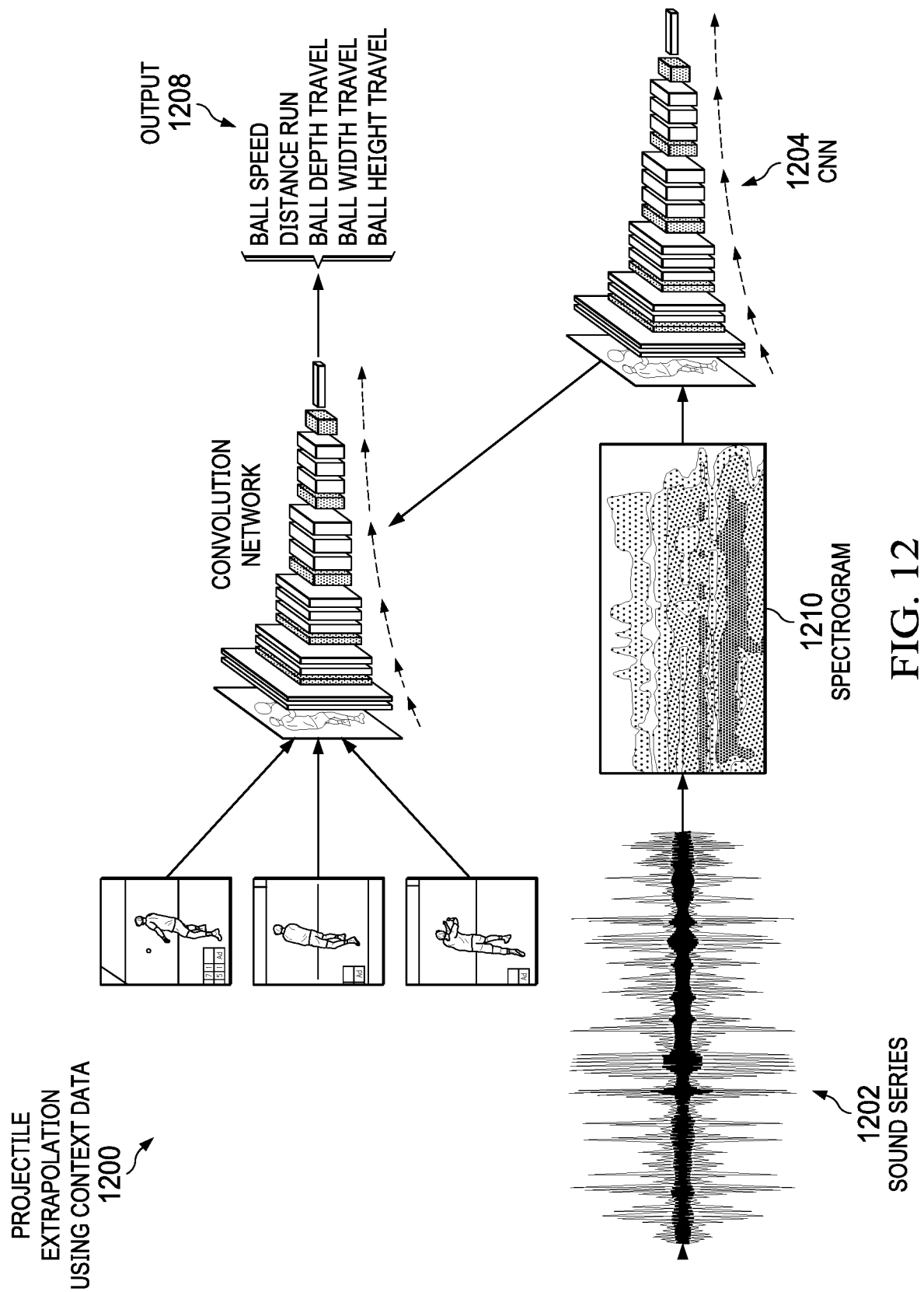
FIG. 12 is a diagram illustrating an example of projectile extrapolation using context data in accordance with an illustrative embodiment.

With reference now to FIG. 12, a diagram illustrating an example of projectile extrapolation using context data is depicted in accordance with an illustrative embodiment. Projectile extrapolation using context data 1200 uses sound series 1202 as input to convolutional neural network 1204 and the output is input into convolutional neural network 1206 to produce output 1208. In other words, illustrative embodiments not only utilize the projectile information output by convolutional neural network 1206, but also utilize the sound information output by convolutional neural network 1204. The sound information gives context to the tennis match play and may be utilized by illustrative embodiments to generate differing optimal tennis strokes based on the emotion of the player and/or the power of the player detected in the sound information. Illustrative embodiments convert a series of sound waves, such as sound series 1202, into a spectrogram, such as spectrogram 1210, to be input into convolutional neural network 1204. Sound convolutional neural network 1204 parses and understands spectrogram 1210, which then is merged within the image convolutional neural network 1206 deep learning layers. Output 1208 includes a feature vector of ball coordinates and other data.

Figure 13:
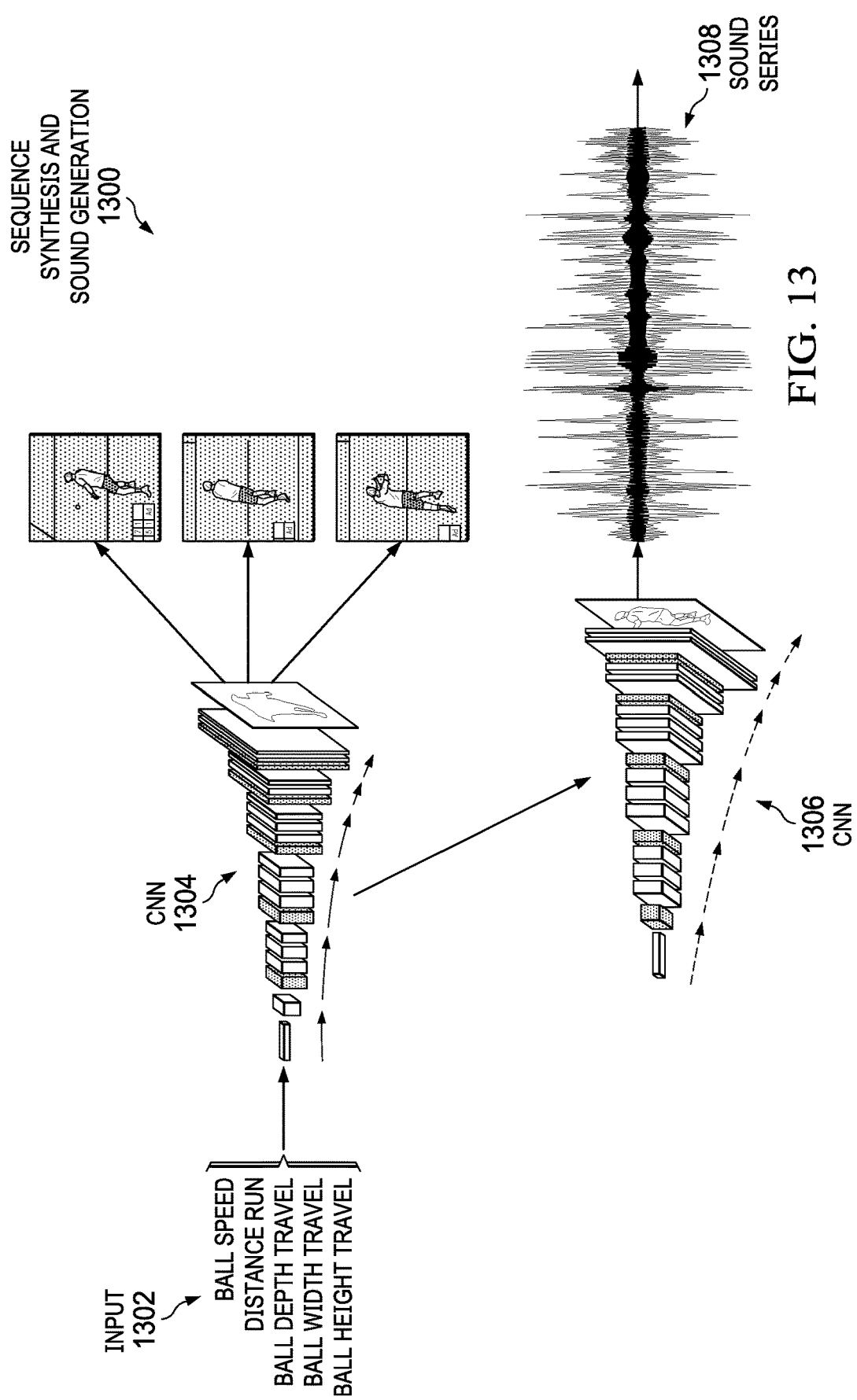
FIG. 13 is a diagram illustrating an example of sequence synthesis and sound generation in accordance with an illustrative embodiment.

With reference now to FIG. 13, a diagram illustrating an example of sequence synthesis and sound generation is depicted in accordance with an illustrative embodiment. Sequence synthesis and sound generation 1300 feeds input 1302 into deconvolutional neural network 1304 to produce alternative image sequences and uses deconvolutional neural network 1306 to generate sound series 1308. In other words, illustrative embodiments synthesize both a set of alternative image sequences and a sound series from projectile extrapolation information. The feed forward layer of convolutional neural network 1304 sends weights to the secondary convolutional neural network 1306 to produce a sound based on sound series 1308.

Figure 14:
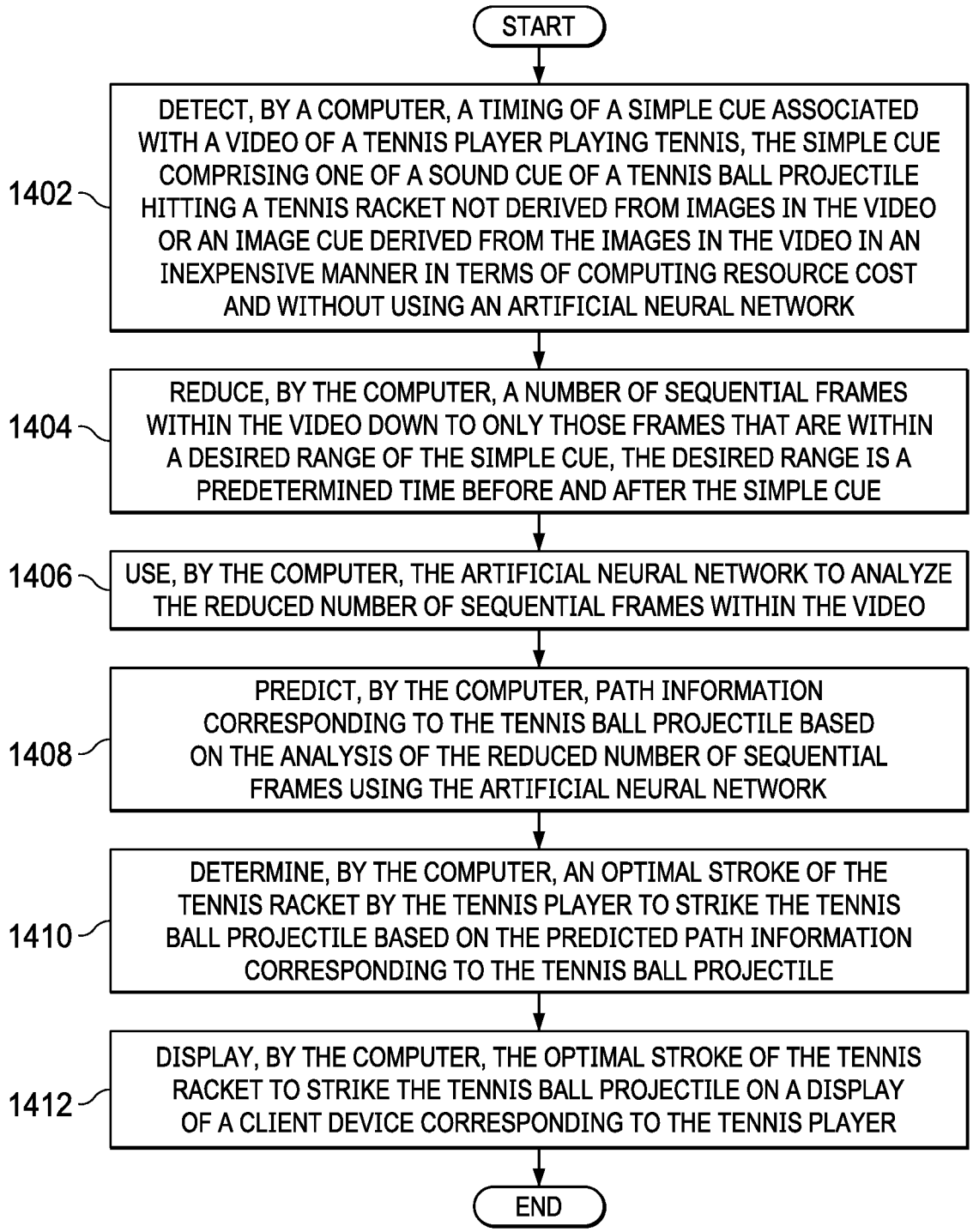
FIG. 14 is a flowchart illustrating a process for automatically determining an optimal stroke of a tennis racket to strike a tennis ball in accordance with an illustrative embodiment.

With reference now to FIG. 14, a flowchart illustrating a process for automatically determining an optimal stroke of a tennis racket to strike a tennis ball is shown in accordance with an illustrative embodiment. The process shown in FIG. 14 may be implemented in a computer, such as, for example, server 104 in FIG. 1 or data processing system 200 in FIG. 2.

The process begins when the computer detects a timing of a simple cue associated with a video of a tennis player playing tennis (step 1402). The simple cue comprises one of a sound cue of a tennis ball projectile hitting a tennis racket not derived from images in the video or an image cue derived from the images in the video in an inexpensive manner in terms of computing resource cost and without using an artificial neural network. The computer reduces a number of sequential frames within the video down to only those frames that are within a specified range of the simple cue (step 1404). The specified range is a predetermined time before and after the simple cue.

The computer uses the artificial neural network to analyze the reduced number of sequential frames within the video (step 1406). In addition, the computer predicts path information corresponding to the tennis ball projectile based on the analysis of the reduced number of sequential frames using the artificial neural network (step 1408). The computer also determines an optimal stroke of the tennis racket by the tennis player to strike the tennis ball projectile based on the predicted path information corresponding to the tennis ball projectile (step 1410). Further, the computer displays the optimal stroke of the tennis racket to strike the tennis ball projectile on a display of a client device corresponding to the tennis player (step 1412). Thereafter the process terminates.

Figure 15:
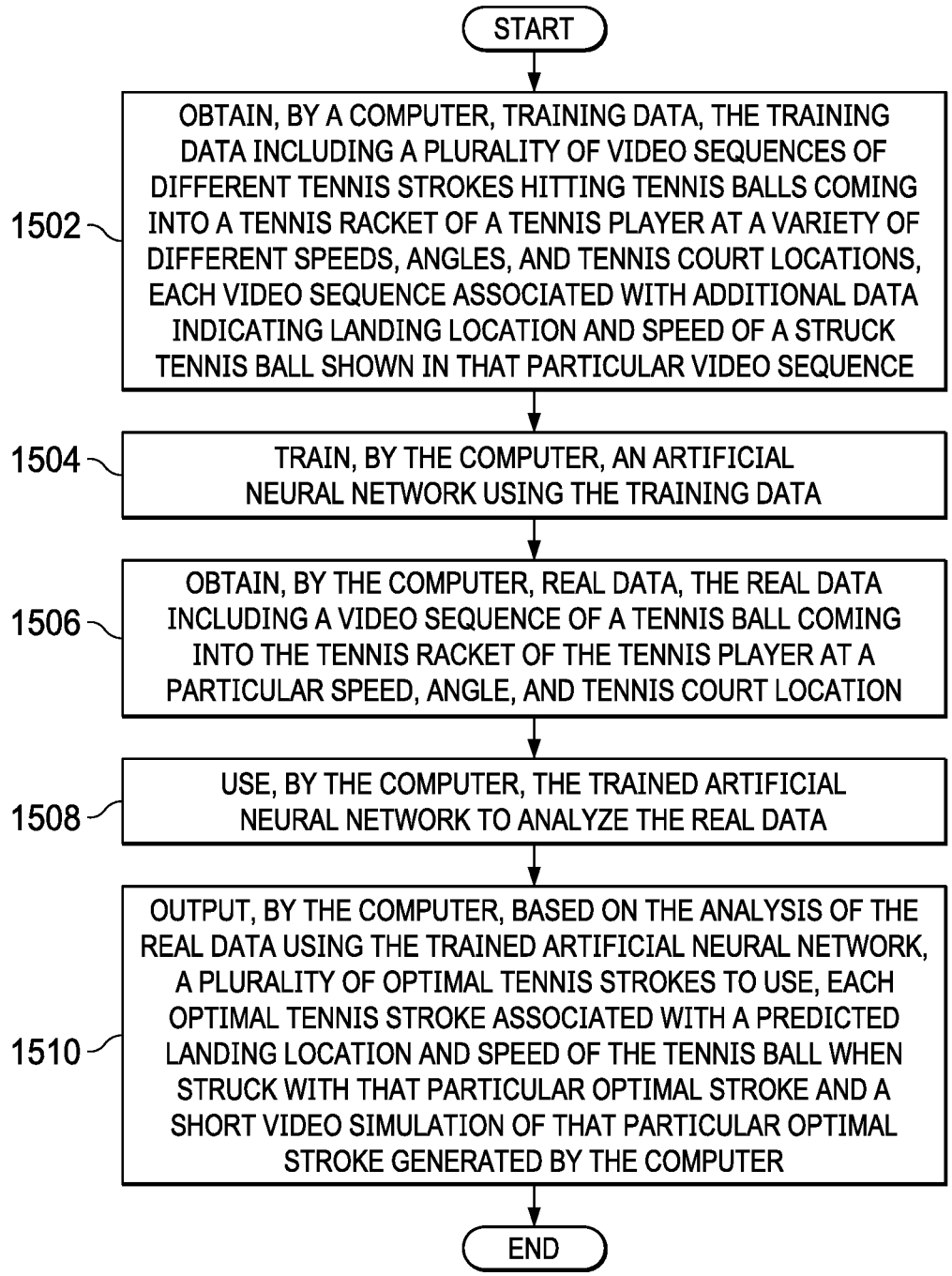
FIG. 15 is a flowchart illustrating a process for outputting a plurality of optimal strokes to use in accordance with an illustrative embodiment.

With reference now to FIG. 15, a flowchart illustrating a process for outputting a plurality of optimal strokes to use is shown in accordance with an illustrative embodiment. The process shown in FIG. 15 may be implemented in a computer, such as, for example, server 104 in FIG. 1 or data processing system 200 in FIG. 2.

The process begins when the computer obtains training data (step 1502). The training data includes a plurality of video sequences of different tennis strokes hitting tennis balls coming into a racket of a tennis player at a variety of different speeds, angles, and tennis court locations. Each video sequence in the plurality of video sequences is associated with additional data indicating landing location and speed of a struck tennis ball shown in that particular video sequence. Afterward, the computer trains an artificial neural network using the training data (step 1504).

In addition, the computer obtains real data (step 1506). The real data includes a video sequence of a tennis ball coming into the tennis racket of the tennis player at a particular speed, angle, and tennis court location. The computer uses the trained artificial neural network to analyze the real data (step 1508). Then, the computer, based on the analysis of the real data using the trained artificial neural network, outputs a plurality of optimal tennis strokes to use (step 1510). Each optimal tennis stroke in the plurality of optimal tennis strokes is associated with a predicted landing location and speed of the tennis ball when struck with that particular optimal stroke and a short video simulation of that particular optimal stroke. The computer generates the short video simulations.

Thus, illustrative embodiments of the present invention provide a computer-implemented method, computer system, and computer program product for projectile extrapolation and alternative image sequence synthesis from video using an artificial neural network. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for using a cue to reduce a number of sequential frames included in a video that needs to be analyzed by a merged parallel convolutional neural network to predict information corresponding to a tennis ball depicted within the video, the computer-implemented method comprising:
    detecting a timing of the cue associated with the video of a tennis player playing tennis;
    reducing the number of sequential frames within the video down to only those frames that are within a specified range of the cue to show three video clips representing wind up, ball hit, and follow through sequences, respectively, of the tennis player hitting the tennis ball;
    using the merged parallel convolutional neural network to input in parallel and process in parallel at a same time the three video clips representing the wind up, ball hit, and follow through sequences of the tennis player hitting the tennis ball shown in the reduced number of sequential frames;
    predicting the information corresponding to the tennis ball based on the merged parallel convolutional neural network inputting in parallel and processing in parallel at the same time the three video clips representing the wind up, ball hit, and follow through sequences of the tennis player hitting the tennis ball shown in the reduced number of sequential frames; and
    inputting the predicted information corresponding to the tennis ball into a deconvolutional neural network to generate alternative image sequences of optimal tennis strokes for hitting the tennis ball, wherein each optimal tennis stroke is associated with at least one of a predicted landing location of the tennis ball or speed of the tennis ball when struck with that particular optimal tennis stroke.

2. The computer-implemented method of claim 1, wherein the cue is a sound of the tennis ball hitting a tennis racket of the tennis player.

3. The computer-implemented method of claim 2 further comprising:
    determining an optimal stroke of the tennis racket by the tennis player to strike the tennis ball based on predicted path information corresponding to the tennis ball; and
    displaying the optimal stroke of the tennis racket to strike the tennis ball on a display of a device corresponding to the tennis player.

4. The computer-implemented method of claim 2, wherein the reduced number of sequential frames comprises only those frames that are within a predetermined time before and after the sound of the tennis ball hitting the tennis racket of the tennis player.

5. The computer-implemented method of claim 1, wherein the cue comprises one of a sound cue not derived from images in the video or an image cue derived from the images in the video.

6. The computer-implemented method of claim 1 further comprising:
    obtaining training data for the merged parallel convolutional neural network, the training data including a plurality of video sequences of different tennis strokes hitting tennis balls coming into a tennis racket at a variety of different speeds, angles, and tennis court locations, wherein each video sequence in the plurality of video sequences is associated with additional data indicating landing location and speed of a struck tennis ball shown in that particular video sequence; and
    training the merged parallel convolutional neural network using the training data.

7. The computer-implemented method of claim 6 further comprising:
    obtaining real data, the real data including a video sequence of the tennis ball coming into the tennis racket of the tennis player at a particular speed, angle, and tennis court location;
    using the merged parallel convolutional neural network to analyze the real data to generate the information corresponding to the tennis ball;
    using the deconvolutional neural network to generate the alternative image sequences of the optimal tennis strokes to use based on the information corresponding to the tennis ball generated by the merged parallel convolutional neural network, each optimal tennis stroke is associated with the predicted landing location of the tennis ball and speed of the tennis ball when struck with that particular optimal tennis stroke; and
    overlaying the alternative image sequences of the optimal tennis strokes for hitting the tennis ball onto a training video.

8. A computer system for using a cue to reduce a number of sequential frames included in a video that needs to be analyzed by a merged parallel convolutional neural network to predict information corresponding to a tennis ball depicted within the video, the computer system comprising:
    a bus system;
    a storage device connected to the bus system, wherein the storage device stores program instructions; and
    a processor connected to the bus system, wherein the processor executes the program instructions to:
        detect a timing of the cue associated with the video of a tennis player playing tennis;
        reduce the number of sequential frames within the video down to only those frames that are within a specified range of the cue to show three video clips representing wind up, ball hit, and follow through sequences, respectively, of the tennis player hitting the tennis ball;
        use the merged parallel convolutional neural network to input in parallel and process in parallel at a same time the three video clips representing the wind up, ball hit, and follow through sequences of the tennis player hitting the tennis ball shown in the reduced number of sequential frames;
        predict the information corresponding to the tennis ball based on the merged parallel convolutional neural network inputting in parallel and processing in parallel at the same time the three video clips representing the wind up, ball hit, and follow through sequences of the tennis player hitting the tennis ball shown in the reduced number of sequential frames; and input the predicted information corresponding to the tennis ball into a deconvolutional neural network to generate alternative image sequences of optimal tennis strokes for hitting the tennis ball, wherein each optimal tennis stroke is associated with at least one of a predicted landing location of the tennis ball or speed of the tennis ball when struck with that particular optimal tennis stroke.

9. The computer system of claim 8, wherein the cue is a sound of the tennis ball hitting a tennis racket of the tennis player.

10. The computer system of claim 9, wherein the processor further executes the program instructions to:

determine an optimal stroke of the tennis racket by the tennis player to strike the tennis ball based on predicted path information corresponding to the tennis ball; and display the optimal stroke of the tennis racket to strike the tennis ball on a display of a device corresponding to the tennis player.

11. The computer system of claim 9, wherein the reduced number of sequential frames comprises only those frames that are within a predetermined time before and after the sound of the tennis ball hitting the tennis racket of the tennis player.

12. A computer program product for using a cue to reduce a number of sequential frames included in a video that needs to be analyzed by a merged parallel convolutional neural network to predict information corresponding to a tennis ball depicted within the video, the computer program product comprising a computer readable storage medium having program instructions embodied therewith, the program instructions executable by a computer to cause the computer to perform a method comprising:

detecting a timing of the cue associated with the video of a tennis player playing tennis;

reducing the number of sequential frames within the video down to only those frames that are within a specified range of the cue to show three video clips representing wind up, ball hit, and follow through sequences, respectively, of the tennis player hitting the tennis ball;

using the merged parallel convolutional neural network to input in parallel and process in parallel at a same time the three video clips representing the wind up, ball hit, and follow through sequences of the tennis player hitting the tennis ball shown in the reduced number of sequential frames;

predicting the information corresponding to the tennis ball based on the merged parallel convolutional neural network inputting in parallel and processing in parallel at the same time the three video clips representing the wind up, ball hit, and follow through sequences of the tennis player hitting the tennis ball shown in the reduced number of sequential frames; and inputting the predicted information corresponding to the tennis ball into a deconvolutional neural network to generate alternative image sequences of optimal tennis strokes for hitting the tennis ball, wherein each optimal tennis stroke is associated with at least one of a predicted landing location of the tennis ball or speed of the tennis ball when struck with that particular optimal tennis stroke.

13. The computer program product of claim 12, wherein the cue is a sound of the tennis ball hitting a tennis racket of the tennis player.

14. The computer program product of claim 13 further comprising:

determining an optimal stroke of the tennis racket by the tennis player to strike the tennis ball based on predicted path information corresponding to the tennis ball; and displaying the optimal stroke of the tennis racket to strike the tennis ball on a display of a device corresponding to the tennis player.

15. The computer program product of claim 13, wherein the reduced number of sequential frames comprises only those frames that are within a predetermined time before and after the sound of the tennis ball hitting the tennis racket of the tennis player.

16. The computer program product of claim 12, wherein the cue comprises one of a sound cue not derived from images in the video or an image cue derived from the images in the video.

17. The computer program product of claim 12 further comprising:

obtaining training data for the merged parallel convolutional neural network, the training data including a plurality of video sequences of different tennis strokes hitting tennis balls coming into a tennis racket at a variety of different speeds, angles, and tennis court locations, wherein each video sequence in the plurality of video sequences is associated with additional data indicating landing location and speed of a struck tennis ball shown in that particular video sequence; and training the merged parallel convolutional neural network using the training data.

18. The computer program product of claim 17 further comprising:

obtaining real data, the real data including a video sequence of the tennis ball coming into the tennis racket of the tennis player at a particular speed, angle, and tennis court location;

using the trained merged parallel convolutional neural network to analyze the real data to generate the information corresponding to the tennis ball;

using the deconvolutional neural network to generate the alternative image sequences of the optimal tennis strokes to use based on the information corresponding to the tennis ball generated by the merged parallel convolutional neural network, each optimal tennis stroke is associated with the predicted landing location of the tennis ball and speed of the tennis ball when struck with that particular optimal tennis stroke; and overlaying the alternative image sequences of the optimal tennis strokes for hitting the tennis ball onto a training video.

* * * * *